United States Patent
Podrazhansky et al.

(10) Patent No.: US 6,366,056 B1
(45) Date of Patent: Apr. 2, 2002

(54) BATTERY CHARGER FOR LITHIUM BASED BATTERIES

(75) Inventors: Yury M. Podrazhansky, Norcross; Richard C. Cope, Duluth; Galina K. Kusharskaya, Norcross, all of GA (US)

(73) Assignee: Enrev Corporation, Norcross, GA (US)

( * ) Notice: Subject to any disclaimer, the term of this patent is extended or adjusted under 35 U.S.C. 154(b) by 0 days.

(21) Appl. No.: 09/539,858

(22) Filed: Mar. 31, 2000

Related U.S. Application Data

(60) Provisional application No. 60/138,047, filed on Jun. 8, 1999.

(51) Int. Cl.$^7$ .......................... H01M 10/44; H01M 10/46
(52) U.S. Cl. ....................................................... 320/141
(58) Field of Search ................................ 320/127, 128, 320/130, 133, 135, 137, 139, 141, 145, 160

(56) References Cited

U.S. PATENT DOCUMENTS

| | | | |
|---|---|---|---|
| 4,829,225 A | * | 5/1989 | Podrazhansky et al. |
| 4,947,124 A | | 8/1990 | Hauser |
| 5,561,360 A | * | 10/1996 | Ayres et al. |
| 5,600,226 A | * | 2/1997 | Falcon |
| 5,694,023 A | * | 12/1997 | Podrazhansky et al. |
| 5,739,672 A | * | 4/1998 | Lane |
| 5,998,968 A | * | 12/1999 | Pittman et al. |
| 6,097,172 A | * | 8/2000 | Podrazhansky et al. |

FOREIGN PATENT DOCUMENTS

| | | |
|---|---|---|
| EP | 0 336 381 A2 | 10/1989 |
| EP | 0 762 594 A1 | 3/1997 |
| EP | 0 847 123 A1 | 6/1998 |
| WO | WO98 52270 | 11/1998 |

* cited by examiner

*Primary Examiner*—Edward H. Tso
(74) *Attorney, Agent, or Firm*—Troutman Sanders, LLP; Charles L. Warner

(57) ABSTRACT

A method for charging a battery, such as a lithium based battery, which applies different charge pulses and discharge pulses to the battery, takes voltage measurements during those charge pulses, discharge pulses, and rest periods between the charge pulses and discharge pulses, and determines whether to terminate or to continue charging the battery. The full sequence of charge pulses, discharge pulses, and rest periods, includes a plurality of charge pulses (1), separated by rest periods (2) and followed by a rest period (3). This is then followed by a plurality of discharge pulses (4), separated by rest periods (5) and followed by a rest period (6). This is then followed by a plurality of extended charge pulses (7), separated by rest periods (8) and followed by a rest period (9). Then another discharge pulse (10) is applied, followed by a rest period (11). This is followed by a plurality of alternating charge pulses (13) and discharge pulses (12), separated by rest periods (13, 15) and followed by a rest period (16). Then another plurality of discharge pulses (17) is applied, separated by rest periods (18) and followed by a rest period (19). Open circuit voltage measurements taken during the rest periods, loaded circuit voltage measurements taken during the discharge pulses, and charge pulse voltage measurements taken during the charge pulses, are used to determine whether to continue or to terminate the charging of the battery.

25 Claims, 2 Drawing Sheets

BATTERY CHARGER FOR LITHIUM BASED BATTERIES

CROSS REFERENCE TO RELATED APPLICATION

This patent application claims the priority of U.S. Provisional Patent Application No. 60/138,047 filed Jun. 8, 1999.

TECHNICAL FIELD

The present invention is a fast charging process for lithium-based batteries.

BACKGROUND OF THE INVENTION

The number and variety of portable devices has been constantly increasing, from small applications such as cellular phones, personal digital assistants (PDAs) and portable computers, to applications as large as electric vehicles and lift trucks. As a result, the focus of improving the performance of these devices has been concentrated in two areas: better batteries, and more energy efficient products. More energy efficient products means computer chips and other components which consume less energy, thereby reducing the frequency of recharging.

The area of better batteries involves two aspects: the battery itself, and the method of charging the battery. With respect to the battery itself, better batteries means smaller and lighter batteries which can store more energy, with a greater energy density, more effectively, for longer periods, under varying conditions of operation, and with more flexibility in packaging. Although battery manufacturers have been successful in developing new batteries that exhibit one or more of these characteristics, those batteries frequently have a shorter cycle-life and use increasingly unstable and less understood elements to achieve those characteristics.

There has also been a strong focus on faster and more efficient methods of charging the battery. However, there are significant differences in the electrochemical natures of different battery types so different types of battery chargers, and different methods of charging, are necessary to address these different battery types and their associated different charging requirements and limitations. However, even with continued advances with respect to more energy efficient devices and better batteries, the users of battery-operated devices continue to experience problems.

Most prior art battery charging methods have focused on charging methods for lead acid, nickel cadmium, and nickel metal hydride batteries. In practice, the majority of chargers in use today for these battery chemistries feature traditional constant current and trickle charging techniques. Others chargers use fast charging techniques which are often nothing more than a higher level of constant current. Some fast charging methods are accompanied by a basic charge termination method, and some use a current cutback as the battery nears the end of charge cycle or approaches a predetermined charge level. Other chargers utilize pulse charging, which consists of positive current pulses which are separated by rest periods, discharge pulses, or both. However, these charging methods often result in long charging times and/or premature battery degradation, and therefore a lack of availability and/or reliability in those battery-operated devices.

Some prior art battery chargers, especially those for use with NiCd and NiMH batteries, measure the temperature of the battery, such as by sensing the resistance of a thermistor which is located inside the battery. If the battery temperature is not within predetermined parameters, a fault condition exists and the charger does not initiate, or stops, the charging process. If there is no fault condition, a rapid charge sequence may be initiated. The temperature and voltage of the battery is monitored. In addition, changes in battery voltage can be monitored. When the slope of the battery-charging curve becomes negative, or the battery temperature reaches a predetermined value, the battery is fully charged, so fast charging is terminated, and a trickle charge process is started.

However, this type of fast charging process does not work well with lithium-based batteries, such as lithium-ion and lithium-polymer batteries, and problems occur when the above fast-charging techniques are used with lithium-based batteries. Continuous high current, i.e., greater than the 1C rate where C is the capacity of the battery, causes metallic lithium to plate or be deposited onto the electrode. This permanently reduces the capacity of the cell. Another problem is the decomposition of the electrolyte. Another problem caused by conventional fast charging methods is overheating of the battery, which causes the battery's useful life to be shortened. Still another problem is explosive, destructive failure of the battery.

Lithium-ion cells have unique characteristics which make rapid charging difficult: lithium ion cells cannot tolerate the application of a high amplitude direct current. Moreover, lithium ion cells have demonstrated a propensity to explosively fail upon the application of excessive charging voltages. Thus, for safety reasons, all manufacturers impose a voltage limit of approximately 4.2 volts. Further, continuous high current (i.e., greater than the cells 1C rate) causes metallic lithium to plate onto the electrode rather than being adsorbed into the electrode. This can permanently reduce the capacity of the cell.

Thus, for charging lithium-based batteries, a constant current/constant voltage (CC/CV) technique is the most common method. In conjunction with the CC/CV method, many chargers will complete the charge process with a trickle charge stage. If the battery temperature reaches a predetermined value, or the battery voltage reaches some predetermined value, then primary charging is terminated in order to prevent overheating of the battery. The charger is then placed in a trickle-charge mode where the battery is charged at the rate of approximately C/10 to C/20. For example, if the battery has capacity of 1000 mAh, at a C/10 charge rate the charger would charge the battery using a current of 100 mAh. These prior art methods typically require 3 to 10 hours to fully charge a lithium-based battery and still tend to heat the batteries, which causes the battery's useful life to be shortened.

The long charging time and short battery life result when the concentration gradient increased and the diffusion rate or intercalation of lithium ion into the carbon or graphite electrode decreased and the battery approached a steady state condition wherein the battery would not accept the charging current. When this condition was reached the low amplitude of the charging current resulted in a charging time of hours to complete the charge. When this condition occurred, the charging voltage was often increased so as to force a higher charging current into the battery in an attempt to reduce the charging time. This results in dissolution of the electrolyte, the plating of metallic lithium, and a consequent shortening of the battery life. Thus, in addition to a still too long charging time of 3 to 4 hours, the actual lifetime of those batteries was reduced, generally to about 300 cycles.

Thus, there is a need for a charging technique which provides for safe, fast recharging of lithium-based batteries without causing degradation of the batteries.

SUMMARY OF INVENTION

The present invention provides a method and an apparatus which safely and rapidly charges lithium-based batteries while reducing the negative side effects which result in premature battery capacity degradation or destructive failure.

In accordance with the preferred embodiment of the present invention, several stages are implemented to effect fast and efficient charging of the battery, full charging of the battery, and terminating the charging of the battery. These stages include a charging stage, two removal stages, and a measurement stage. The charging stage comprises one or more charge pulses separated by rest periods. One removal stage comprises a plurality of alternating charge pulses and discharge pulses, separated by rest periods. Another removal stage comprises one or more large magnitude discharge pulses followed by rest periods. These three stages are applied to the battery in a sequence that rapidly charges the battery, efficiently mixes the electrolyte within the battery, provides voltage and impedance measurements to determine the condition of the battery, and restores a battery's capacity. The measurement stage controls the application of the other three stages and the parameters of the charge pulses, the discharge pulses, and the rest periods.

The present invention provides for rapid charging of the battery by reducing the build up of a resistive layer (metallic lithium) on the positive electrode, by minimizing dendritic formation which causes internal short circuits, and by minimizing the decomposition of the electrolyte. These three factors, a resistive layer, dendritic formation, and electrolyte 10 decomposition, are generally responsible for decreasing the performance, and therefore the useful life cycle time, of lithium-based batteries.

According to the invention, there is provided a method and algorithm for rapidly charging lithium-based batteries, such as lithium ion and lithium polymer cells and batteries.

The present invention provides a method for charging a battery, comprising the steps of applying a plurality of charge pulses to the battery, the charge pulses each having a duration and being separated by a corresponding plurality of rest periods, applying an extended charge pulse to the battery, the extended charge pulse having a duration greater than the durations of the charge pulses, measuring the charge pulse voltage (CPV) of the battery during the extended charge pulse, applying a subsequent rest period to the battery after the extended charge pulse, measuring the open circuit voltage (OCV) of the battery during the subsequent rest period, determining the difference between the CPV and the OCV, and terminating charging of the battery if the difference is less than a predetermined value.

The present invention also provides another method for charging a battery, comprising the steps of applying a plurality of charge pulses to the battery, the charge pulses each having a duration and being separated by a corresponding plurality of rest periods, applying a plurality of alternating charge pulses and discharge pulses to the battery, measuring the charge pulse voltage (CPV) of the battery during at least one of the alternating charge pulses, applying a subsequent rest period to the battery after the plurality of alternating charge pulses and discharge pulses, measuring the open circuit voltage (OCV) of the battery during the subsequent rest period, determining the difference between the CPV and the OCV, and terminating charging of the battery if the difference is less than a predetermined value. One variation of this method provides for, after the step of applying the plurality of charge pulses, applying an extended charge pulse to the battery, the extended charge pulse having a duration greater than the durations of the charge pulses, and applying a rest period to the battery after the extended charge pulse.

The present invention also provides another method for charging a battery, comprising the steps of applying a plurality of charge pulses to the battery, the charge pulses being separated by a corresponding plurality of rest periods, applying a subsequent discharge pulse to the battery, measuring the loaded circuit voltage (LCV) of the battery during the subsequent discharge pulse, applying a subsequent rest period to the battery after the subsequent discharge pulse, measuring the open circuit voltage (OCV) of the battery during the subsequent rest period, determining the difference between the LCV and the OCV, and terminating charging of the battery if the difference is less than a predetermined value. One variation of this method provides for, after the step of applying the plurality of charge pulses, the charge pulses each having a duration, applying an extended charge pulse to the battery, the extended charge pulse having a duration greater than the durations of the charge pulses, and applying a rest period to the battery after the extended charge pulse. Another variation of this method provides for, after the step of applying the plurality of charge pulses, applying a plurality of alternating charge pulses and discharge pulses to the battery, each discharge pulse having an amplitude, and applying a rest period to the battery after the plurality of alternating charge pulses and discharge pulses, wherein the discharge pulse has an amplitude greater than the amplitudes of the discharge pulses of the plurality of alternating charge pulses and discharge pulses. Still another variation of this method provides for, after the step of applying the plurality of charge pulses, the charge pulses each having a duration, applying an extended charge pulse to the battery, the extended charge pulse having a duration greater than the durations of the charge pulses, applying a rest period to the battery after the extended charge pulse, applying a plurality of alternating charge pulses and discharge pulses to the battery, each discharge pulse having an amplitude, and applying a rest period to the battery after the plurality of alternating charge pulses and discharge pulses, wherein the discharge pulse has an amplitude greater than the amplitudes of the discharge pulses of the plurality of alternating charge pulses and discharge pulses. Still another variation of this method provides for, if the difference is greater than the predetermined value, but less than a second predetermined value, then increasing at least one of amplitude or the duration of the subsequent discharge pulse, and repeating the steps previous to these steps.

The present invention also provides another method of charging a battery, comprising the steps of applying a plurality of charge pulses to the battery, the charge pulses each having a duration and being separated by a corresponding plurality of rest periods, applying a rest period to the battery after the plurality of charge pulses, applying a subsequent discharge pulse to the battery, the subsequent discharge pulse having an amplitude greater than the amplitudes of the plurality of charge pulses, measuring the loaded circuit voltage (LCV) of the battery during the subsequent discharge pulse, applying a subsequent rest period to the battery after the subsequent discharge pulse, measuring the open circuit voltage (OCV) of the battery during the subsequent rest period, determining the difference between the LCV and the OCV, and terminating charging of the battery if the difference is less than a predetermined value. One variation of this method provides for, after the step of applying the rest period to the battery after the plurality of charge pulses, applying an extended charge pulse to the battery, the extended charge pulse having a duration greater than the durations of the charge pulses, the extended charge pulse having an amplitude, and applying a rest period to the battery after the extended charge pulse, wherein the amplitude of the subsequent discharge pulse is greater than the amplitude of the extended charge pulse. Another variation of this method provides for, after the step of applying the rest period to the battery after the plurality of charge pulses, applying a plurality of alternating charge pulses and discharge pulses to the battery, each discharge pulse having an amplitude, applying a rest period to the battery after the plurality of alternating charge pulses and discharge pulses, wherein the subsequent discharge pulse has an amplitude greater than the amplitudes of the discharge pulses of the plurality of alternating charge pulses and discharge pulses. Still another variation of this method provides for, after the step of applying the rest period to the battery after the plurality of charge pulses, applying an extended charge pulse to the battery, the extended charge pulse having a duration greater than the durations of the charge pulses, the extended charge pulse having an amplitude, and applying a rest period to the battery after the extended charge pulse, applying a plurality of alternating charge pulses and discharge pulses to the battery, each discharge pulse having an amplitude, applying a rest period to the battery after the plurality of alternating charge pulses and discharge pulses, wherein the amplitude of the subsequent discharge pulse is greater than the amplitude of the extended charge pulse and greater than the amplitudes of the discharge pulses of the plurality of alternating charge pulses and discharge pulses. Still another variation of this method provides for, if the difference is greater than the predetermined value, but less than a second predetermined value, then increasing at least one of amplitude or the duration of the subsequent discharge pulse, and repeating the steps previous to these steps.

The present invention also provides another method of charging a battery, comprising the steps of applying a discharge pulse to the battery, applying a rest period to the battery after the discharge pulse, applying an extended charge pulse to the battery, applying a rest period to the battery after the extended charge pulse, applying a plurality of alternating charge pulses and discharge pulses to the battery, measuring the loaded circuit voltage (LCV) of the battery during a discharge pulse of the plurality of alternating charge pulses and discharge pulses, applying a rest period to the battery after the plurality of alternating charge pulses and discharge pulses, measuring the open circuit voltage (OCV) of the battery during the rest period after the plurality of alternating charge pulses and discharge pulses, determining the difference between the LCV and the OCV, and terminating charging of the battery if the difference is less than a predetermined value. One variation of this method provides for, prior to the step of applying the discharge pulse to the battery, applying a plurality of charge pulses to the battery, the charge pulses each having an amplitude and being separated by a corresponding plurality of rest periods, the discharge pulse having an amplitude greater than the amplitudes of the plurality of charge pulses. Another variation of this method provides for, prior to the step of applying the discharge pulse to the battery, applying a plurality of charge pulses to the battery, the charge pulses each having an amplitude and being separated by a corresponding plurality of rest periods, the discharge pulse having an amplitude greater than the amplitudes of the plurality of charge pulses, and applying a rest period to the battery after the plurality of charge pulses. Still another variation of this method provides for, if the difference is greater than the predetermined value, but less than a second predetermined value, then increasing at least one of amplitude or the duration of the subsequent discharge pulse, and repeating the steps previous to these steps.

A variation of the above methods which include a plurality of charge pulses provides for increasing a predetermined parameter of the charge pulses of the plurality of charge pulses from the beginning of the plurality to the end of the plurality so that the parameter of the last charge pulse of the plurality of charge pulses is greater than the parameter of the charge pulse of the plurality of charge pulses, wherein the predetermined parameter is a selected one of the amplitude of a the charge pulse or the duration of a the charge pulse.

Another variation of the above methods which include a plurality of charge pulses provides, if the difference is greater than the predetermined value, then increasing the number of the charge pulses of the plurality of charge pulses, and repeating the steps previous to these steps.

Another variation of the above methods which include a plurality of charge pulses provides, if the difference is greater than the predetermined value, but less than a second predetermined value, then increasing the durations of the rest periods between the plurality of charge pulses.

The present invention also provides an apparatus for accomplishing battery charging using the methods described herein.

DETAILED DESCRIPTION

Figure 1:
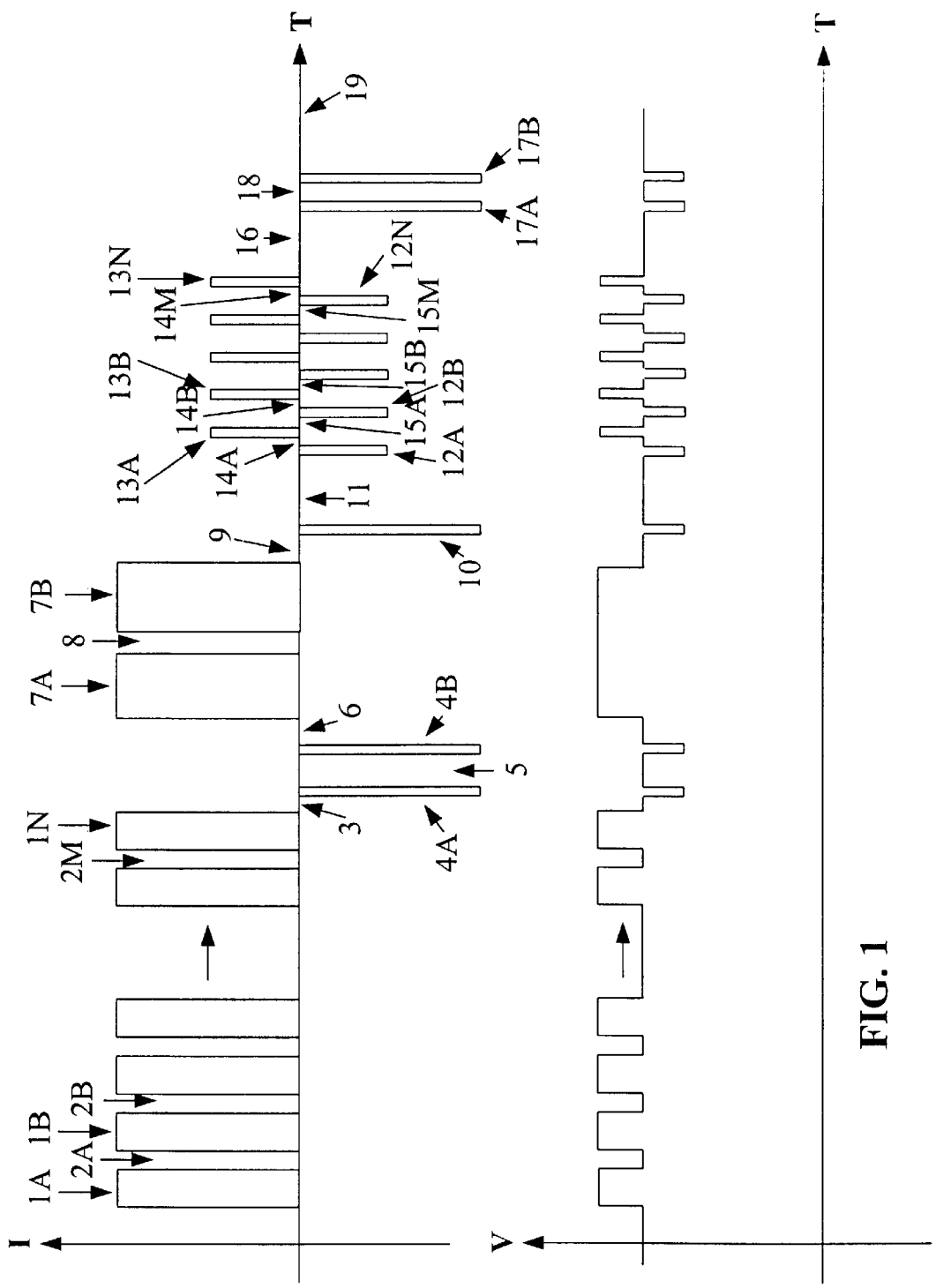
FIG. 1 is an illustration of the charging process of the present invention.

FIG. 1 is an illustration of the preferred charging process of the present invention. For convenience of illustration, waveforms have been shown as rectangular shapes. However, it will be appreciated by those of skill in the art, and from a reading of the description below, that waveforms typically have different characteristics, such as ramping, sloping, and noise. The process may be considered to be a repeating cycle preferably having the four stages mentioned above: a charging stage, a dendrite and particle removal stage, a lithium plating removal stage, and a measurement stage. These stages are repeated until the desired level of battery charge has been achieved. Although the charging stage is preferably performed first, these stages need not be applied in any particular order, and one stage may, if desired, be interrupted by or surrounded by the performance of another stage. Both of the removal stages are preferred, but neither is mandatory, and each will provide some benefit without the other.

The Charging Stage

In general, the charging stage comprises a series of charge pulses 1A–1N, separated by rest or wait periods 2A–2M, another rest period 3, and at least one extended charge pulse 7, such as charge pulse 7A. In the charging stage, the charge pulses 1A–1N preferably have durations of 0.01 to 100 milliseconds. The pulses may all have the same duration, or different durations, and may vary within a charge stage, or from charge stage to charge stage. In the preferred embodiment, the durations are fixed within a charge stage. The durations may be increased up to a predetermined limiting duration. The charge pulses 1A–1N preferably have an amplitude of 1C to 15C. The pulses may all have the same amplitude, or different amplitudes, and the amplitudes may vary within a charge stage and/or from charge stage to charge stage. However, in the preferred embodiment, the amplitudes are fixed within a charge stage, and increase from a low starting value for the first charge stage to higher and higher values for subsequent charge stages until a predetermined maximum amplitude is reached, or the measurements indicate that the amplitude should not be increased further or should be decreased. The duration and amplitude of the charge pulses is dynamic and varies in response to a battery condition, such as the state of charge, or the deposition of metallic lithium, as described below. The number N of charge pulses may be fixed or may be variable within predetermined limits, and may vary from charge stage to charge stage. If the lower limit is too small, then the charging process may be unnecessarily extended; and if the upper limit is too large, the battery may be overcharged or damaged before a measurement stage is begun. In one embodiment, N is fixed. In another embodiment, N varies depending upon the state of charge of the battery. For example, N may start small, until the condition of the battery is determined, and then increase, until the battery nears a full charge, and then decrease as the charging is completed. In the preferred embodiment, the number N of charge pulses 1 ranges between 1 and 1000. Preferably, N is in the range of 200 to 300, so that the loaded circuit voltage can be measured and the battery condition determined frequently, such as every 500 to 600 milliseconds, to avoid damage to the battery and to avoid excessive charging times.

The rest periods 2A–2M preferably have a duration not greater than the duration of the charge pulses 1A–1N. The rest periods may have the same duration, or different durations, and may also vary from charge stage to charge stage. Preferably, the durations of the rest periods 2A–2M follow the durations of the charge pulses 1A–1N. That is, if the durations of the charge pulses are increasing, either within a charge stage or from charge stage to charge stage, then the durations of the rest periods will also increase, and vice versa. The rest period 3, 5 or 6 following the charge pulse 1N preferably has a duration not greater than the duration of the charge pulse 1N. In the preferred embodiment, the rest periods 2 have a duration of 2 to 6 milliseconds, depending upon the type of anode and the ability of that anode to adsorb the lithium.

A charge stage may end after the last charge pulse 1N. However, in the charge stage of the preferred embodiment, the charge pulse 1N is followed by a rest period 3, 5 or 6, and then by at least one extended charge pulse 7A. In the preferred embodiment, there are at least two extended charge pulses 7A, 7B, and there may be more (not shown). In the preferred embodiment, an extended charge pulse 7 has an amplitude of 0.1 to 15 amps, or 1C to 15C, and a duration of 5 to 500 milliseconds. As with charge pulses 1A–1N, the amplitude and duration may be fixed, or may be variable, and may depend upon the stage of charge of the battery and the type of battery. If there are two or more charge pulses 7, then they are separated by one or more rest periods 8. A rest period 8 preferably has a duration not less than 100 milliseconds and not more than 3 seconds. If there are more than two extended charge pulses 7 the duration of a rest period 8 may vary in accordance with the durations of the charge pulses 7 within a charge cycle. If there are more than two extended charge pulses 7 the duration of a rest period 8 may also vary in accordance with the durations of the charge pulses 7 from charge cycle to charge cycle.

Following any extended charge pulses 7, there is preferably a rest period 9 or 11. The rest period following the last extended charge pulse 7 preferably has a duration not less than the duration of that extended charge pulse. The duration of that rest period may be fixed or may vary from charge stage to charge stage, either along with, or independently of, the duration of the extended charge pulse 7.

In the preferred embodiment, where at least one extended charge pulse 7 is used, such as extended charge pulse 7A, the charge pulses 1 provide some charging of the battery, but are mainly for testing for the presence of the battery and for battery conditioning, and the extended charge pulse or pulses 7 provide the primary charge to the battery. In an alternative embodiment, where an extended charge pulse 7 is not used, the charge pulses 1 provide the primary charge to the battery.

The Dendrite Removal Stage

The dendrite removal stage comprises a plurality of pulses 4, 10 and 17, which may be separated by, or preceded by, or followed by, rest periods 3, 5, 6, 9, 11, 16, and 18. Metallic lithium may form dendrites which extend outward from an electrode. If dendrites from different electrodes meet, they form a short circuit which can immediately end the useful life of the battery, and so are an undesirable result of charging the battery. The measurement stage provides large discharge pulses 4, 10 and 17 which reduce the size of the dendrites or cause the dendrites to break off from the electrodes, at which point their growth is stopped. As with the other pulses described above, the amplitudes and durations of these pulses may be fixed, or vary within a cycle, or vary from cycle to cycle. In the preferred embodiment, these discharge pulses are fixed in amplitude and duration, and have amplitudes of 0.1 to 5 amps, and durations of 1 to 50 milliseconds. The actual amplitude and duration will depend upon the type and capacity of the battery being charged. Measurements may also be taken during this removal stage. These discharge pulses also allow a higher current during the extended charge pulses 7 and remove some of the lithium plating prior to the lithium plating removal stage.

When the open circuit voltage reaches a predetermined value, approximately 4 volts per cell, dendrite formation is minimal so the primary function (dendrite removal) of the discharge pulses 4, 10, 17 is no longer needed. Therefore, at this point the discharge pulses 4, 10, 17 will be discontinued.

The Metallic Lithium Removal Stage

The lithium plating removal stage comprises a plurality of alternating discharge pulses 12A–12N and charge pulses 13A–13N, separated by rest periods 14A–14M and 15A 15M. During charging, metallic lithium is deposited upon the electrode and forms a resistive layer. Further, metallic lithium particles may form and block the openings into the electrode, thereby preventing further adsorption at that point on the electrode. This resistive layer and these particles reduce the ability of the battery to accept a charge, and to deliver a charge, and are another undesirable result of charging the battery. These undesirable effects are reduced or eliminated by adjusting the charging process, as described above, and also by this stage. This stage removes or reduces the lithium deposits (both particles and plating) on the electrodes and thus increases the ability of the battery to accept and deliver a charge. In this stage, there is a series of N alternating discharge pulses 12A–12N and charge pulses 13A–13N. This N value is not identical to the N value associated with the charging stage, but charging the parameters in the charging stage may cause readjustment of the parameters of the removal stages. A discharge pulse 12 is preferably followed by a rest period 14, and a charge pulse 13 is preferably followed by a rest period 15. Although a discharge pulse 12A is shown as occurring first, this is not a requirement and a charge pulse 14A may occur first. These discharge pulses 12 and charge pulses 13 may have the same amplitudes and durations, or may have different amplitudes and durations, and may have varying amplitudes and durations. In the preferred embodiment, the discharge pulses 12 and the charge pulses 13 preferably have the same amplitude and duration, and that amplitude and that duration are preferably fixed and do not vary within a removal stage or from removal stage to removal stage. Also, in the preferred embodiment, that amplitude is in the range of 0.1 to 5 amps, depending upon the capacity and rating of the particular battery being charged and the results of the measurements. Further, in the preferred embodiment, that duration is in the range of 1 to 50 milliseconds, depending upon the capacity and rating of the particular battery being charged and the results of the measurements.

The rest periods 14 and 15 may have the same duration, or may have different durations, and may have varying durations. In the preferred embodiment, the rest periods 14 and 15 preferably have the same duration, and that duration is preferably fixed and does not vary within a removal stage or from removal stage to removal stage. Also, in the preferred embodiment, that duration may also be in the range of 2 to 20 milliseconds, depending upon the capacity and rating of the particular battery being charged. As mentioned above, measurements may also be taken during this removal stage.

The overall duration of this removal stage varies depending upon the battery type and the condition of the battery, but is generally in the range of 1 to 100 milliseconds.

This stage also has two functions, it cleans up the separator if the lithium was deposited as a large particle that sticks to the separator and closes the workable area, and it removes the metallic lithium deposit or plating from the small porous openings of the electrode and cleans the surface of the negative electrode. The open circuit voltage measurement is more precise, and generally lower, after this stage.

The Measurement Stage

The measurements of the measurement stage are performed during, or as part of, the charging stage and/or either one or both of the removal stages. Measurements are performed at many times throughout the charging process, from beginning to termination.

In the preferred embodiment, prior to commencing a complete charge cycle, a determination is made as to whether a battery is present. One method of doing this is described below. Once it has been determined that a battery is present the open circuit voltage (OCV), the loaded circuit voltage (LCV), and charge pulse voltage (CPV) are measured. These voltages are used to determine the state of charge or condition of the battery. If these voltages are all low, then the battery is substantially discharged, and so the durations, and/or amplitudes, and/or number, of the charge pulses 1 and 7 are set, up to predetermined maximums, to provide a substantial charging current. If the OCV is within a normal range, but the LCV is low, and the CPV is high, then a substantial metallic lithium plating may be present. In this case the durations, and/or amplitudes, and/or number, of the pulses 12 and 13 are set, up to predetermined maximum values, to quickly remove the plating so as the improve the battery condition. In the preferred embodiment, these parameters start at a low value and are then ramped up, up to their predetermined maximum values, so that the battery condition can be constantly evaluated and the charging process can proceed at the maximum rate possible without damage to the battery.

As mentioned above, measurements are also taken during the other stages. For determination of the battery state of condition, preferably the OCV of the battery and the LCV of the battery are measured. These measurements are performed during selected ones of the pulses 4, 12, or 17, and rest periods 3, 9, 14, 15, 16, 18 and 19. The battery voltage may be measured at any point in a pulse or rest period, but is preferably measured toward the end of the pulse or the rest period. The battery voltage measurements allow the parameters (amplitude, duration, number) of the next charge cycle to be adjusted in accordance with the state of charge of the battery. For example, if the measurements indicate that the battery charge is low, and that the battery is receptive to a higher charge rate, then the amplitude, duration, and/or number of the charge pulses 1 and extended charge pulses 7 will be increased, and/or the amplitude, duration and/or number of removal pulses 4, 10, 12, 17 will be decreased. Conversely, if the measurements indicate that the battery charge is high, or that the battery is not receptive to the present charge rate, then the amplitude, duration, and/or number of the charge pulses and extended charge pulses will be decreased, and/or the amplitude, duration and/or number of removal pulses will be increased.

The difference between the OCV and the LCV is determined and compared with a reference value. If the difference is greater than the reference value, then the battery is being charged too rapidly. In the preferred embodiment, this reference value is 60 millivolts but is not critical. If a larger reference value is used, the battery capacity that can be obtained will be reduced. Conversely, if a smaller reference value is used, more battery capacity can be obtained, up to the limit of the battery, but the overall charging time will be increased. If the battery is being charged too rapidly, then the rate of charging is reduced by any of the methods mentioned above, until the difference is less than the reference value. Preferably, upon starting, the charging parameters will be increased from charging stage to charging stage until the difference voltage is less than the reference value. This is the maximum charging rate. From then on, as the battery becomes more and more charged, the difference voltage will increase, and so the charging parameters will be, in turn, decreased. Thus, the battery is charged as fast as it can accept a charge, but no faster.

In one embodiment, the OCV is measured at the end of the rest period 3, which is the rest period following the last charge pulse 1, and the LCV is measured at the end of pulse 4, preferably pulse 4A. In another embodiment, the OCV is measured at the end of the rest period 9, which is the rest period following the last extended charge pulse 7, and the LCV is measured at the end of the pulse 10. In still another embodiment, the OCV is measured at the end of the rest period 16, and at the end of a pulse 17, preferably pulse 17A. In still another embodiment, the LCV is measured at the end of the last pulse 17, and the OCV is measured during the rest period 19, preferably at least 10 milliseconds into the rest period so that the battery condition will have time to stabilize.

In the preferred embodiment, the charging profile is essentially a constant current charging profile until the open circuit battery voltage reaches a predetermined voltage, approximately 4 volts per cell. As mentioned above, the discharge pulses 4, 10, 17 are preferably terminated once the OCV reaches approximately 4 volts per cell. This OCV measurement may be taken in any rest period but is preferably taken toward the end of rest period 19. Once the OCV has reached this value then the charging profile essentially becomes a constant voltage charging profile.

Once the OCV reaches a predetermined value, typically 4.2 volts per cell for most lithium-based batteries, and the charging current of the charging pulse has been reduced to 100 mAh or less, then the battery has become fully charged and the charging process is terminated. This OCV measurement may be taken in any rest period but is preferably taken toward the end of rest period 19.

In another embodiment, the charging process is terminated when the difference between the OCV and the LCV is less than a predetermined value, such as 60 millivolts.

Internal Electronic Protection Circuitry Problems

Some Lithium-ion and Lithium-ion polymer batteries have electronic protection circuitry that protect the battery from a short circuit. With these batteries, the dendrite removal stage and/or the lithium plating removal stage, and the measurements therein, may be blocked by that circuitry. In this case, only the measurements associated with the charging stage are used to determine the battery condition.

Further, some Lithium-ion and Lithium-ion polymer batteries have electronic protection circuitry that disconnects the battery from the outside world if the battery voltage drops below a predetermined level. This prevents overdischarging the battery. In this case, the battery cannot receive a charge until this electronic circuitry is re-activated. Thus, prior to beginning a complete charging process, the presence of the battery must be determined. If the battery does not have electronic protection circuitry, or if that circuitry has not been activated, then a battery voltage will be present at the battery terminals, so the charging process can begin. However, if there is no battery present in the charger, or if the battery is completely dead, or if the electronic protection circuitry has been activated, there will be no battery voltage present. Thus, it will be necessary to determine why there is no battery voltage present. The charge pulses I serve this purpose. In the preferred embodiment, these charge pulses 1 are repeatedly applied, and the battery voltage is measured during the rest periods 2. If the electronic circuitry has not been re-activated the battery will not be connected, or if the battery is completely dead, then the voltage during the rest periods 2 will be zero, or approximately zero. However, once the electronic circuitry has been re-activated and the battery connected, or the battery recharged slightly, a battery voltage will be present during the rest periods 2. Then, at this point, the charging process can continue past the application of the charge pulses 1, such as by applying the extended charge pulses 7. Preferably, the discharge pulses 4, 10, 17 are not applied until several charge cycles have passed so as to make sure that the battery voltage does not drop too low, and/or cause the electronic circuitry to disconnect the battery again.

Battery Performance Improvement

Because of the inefficiencies or losses during a conventional charging process, a Lithium-ion or Lithium-Polymer battery was designed to contain more lithium to compensate for this loss. For example, in the case of the 18650-type cell, in order to have a rated capacity of 1350 mAh, the battery would have to be designed for a capacity of 2600 mAh for the positive electrode. However, the improved charging process of the present invention, particularly the lithium plating removal stage, allows the full battery capacity, for example, up to 1500 mAh, to be obtained. As a result, the first few hundred charging cycles will maintain at least ninety to ninety-five percent of the battery's rated capacity. This has the benefit of increasing the lifetime of the battery, up to 1000 cycles in the case of lithium cells. Further, the charging time decreases from the conventional 3 to 4 hours down to 50 to 65 minutes. Thus, the present invention increases the available capacity of the battery, increases the cycle life time of the battery, and decreases the charge time of the battery.

The Preferred Embodiment Of The Charging Apparatus Of The Present Invention

Figure 2:
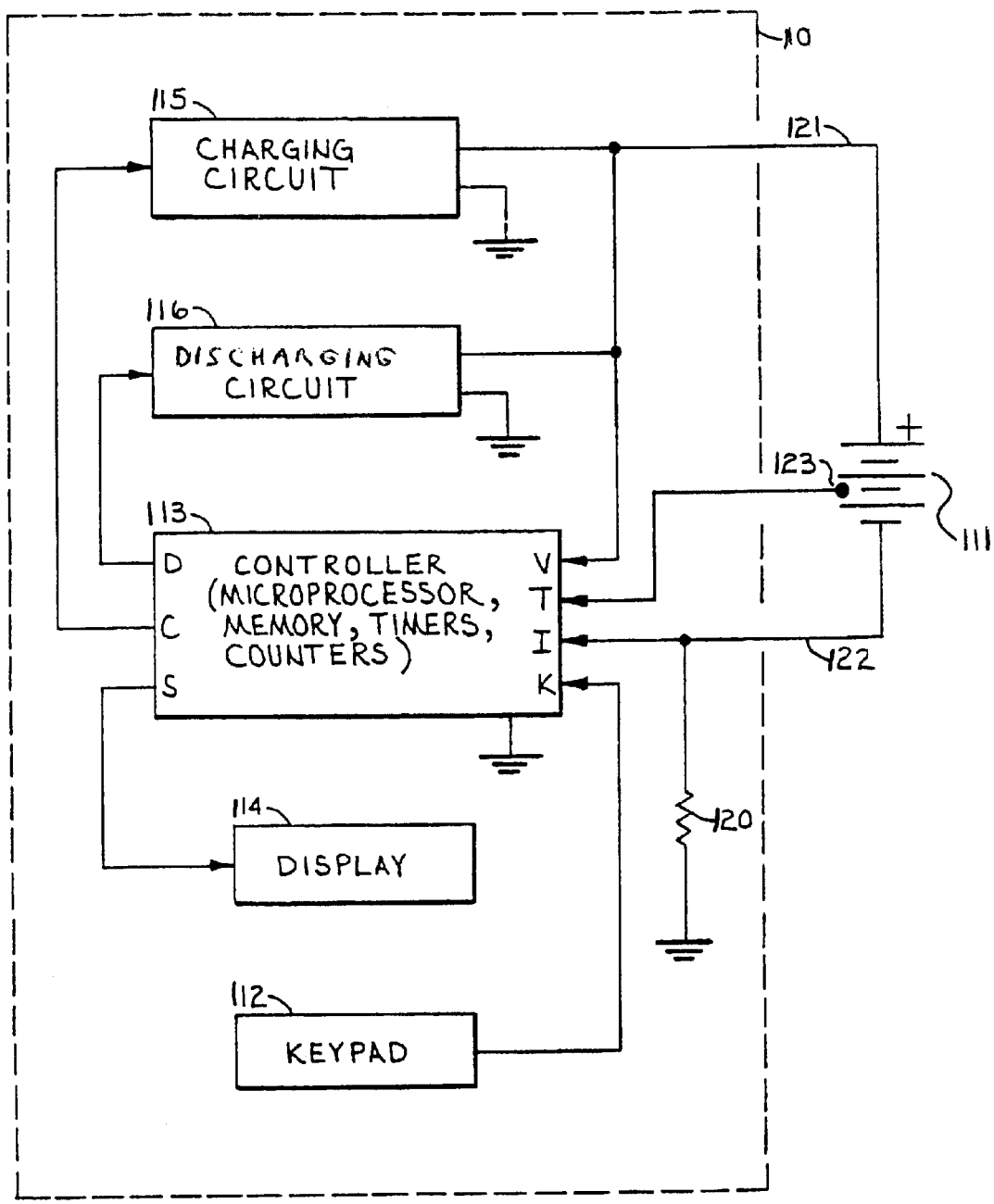
FIG. 2 is a block diagram of the charging apparatus of the present invention.

FIG. 2 is a block diagram of the preferred embodiment of the charging apparatus of the present invention, although other embodiments may be used. The circuit 110 comprises a keypad 112, a controller 113, a display 114, a charging circuit 115, a discharging circuit 116, and a current monitoring circuit 120. Keypad 112 is connected to the "K" input of controller 113 and allows the user to input specified parameters such as the battery type (lithium ion, lithium polymer, etc.), and other relevant information, such as a nominal battery voltage or number of cells in series. Keypad 112 may be a keyboard, dial pad, array of switches, or other device for entering information. To simplify operation by the user, controller 113 may be preprogrammed with the parameters for a plurality of battery types. In this case the user would simply enter a battery type, such as a model number, and controller 113 would automatically use the parameters appropriate for that battery type. Display 114 is connected to the "S" output of controller 113 and displays the information, choices, parameters, etc., for the operator.

The "C" output of controller 113 is connected to charging circuit 115. Charging circuit 115 provides a charging current to the battery 111. Depending upon the application, charging circuit 115 may be configured by controller 113 to perform as a constant voltage source or a constant current source. The "D" output of controller 113 is connected to discharging circuit 116, which may be configured by controller 113 to provide a constant discharge current or apply a selected load to the battery. The pulse width of the pulses provided by circuits 115 and 116 are controlled by controller 113. The output of charging circuit 115 and the output of discharging circuit 116 are connected to the positive terminal of battery 111 via conductor 121. The negative terminal of battery 111 is connected to circuit ground through a resistor 120, which has a nominal value of 0.01 ohm. Current flowing into or out of battery 111 must pass through resistor 120. The current through battery 111 may therefore be determined by measuring the voltage across resistor 120 on conductor 122. Resistor 120 therefore functions as a current monitor and also functions as a current limiter. Of course, other devices, such as Hall effect devices, may be used to determine battery current.

Battery voltage is monitored by measuring the voltage between conductor 121 and circuit ground. The effects of resistor 120 may be eliminated by measuring the voltage between conductors 121 and 122, or by subtracting the voltage on conductor 122 from the voltage on conductor 121. Conductors 121 and 122 are connected to the V and I input, respectively, of controller 113. It will be appreciated that if controller 113 is a logic device, such as a microprocessor, then the signals must be converted to a form usable by controller 113, such as by an analog-to-digital converter.

Battery presence is preferably determined by activating charging circuit 115 and monitoring the open circuit output voltage of the battery during a rest period 2 following a charge pulse 1.

Temperature sensor 123 is optional but can be used to monitor the temperature of battery 111 so that controller 113 can adjust the magnitude, number and duration of the charge pulses and the discharge pulses, and the duration of the rest periods, in order to keep the battery from overheating. Sensor 123 may be a snap action device, such as a thermostat, or an analog device, such as a thermistor or a thermocouple. Sensor 123 be part of battery 111. Temperature sensor 123 is converted to the "T" input of controller 113.

In the preferred embodiment controller 113 comprises a microprocessor, a memory, at least part of which contains operating instructions for controller 113, timers, and counters. The timers, which may be discrete devices or a part of the microprocessor, may be used for controlling the charge pulse duration, the discharge pulse duration or the wait period duration, etc. The counters, which are typically embodied in or implemented by the microprocessor, may be used for integrating the charging current so as to provide an indication of the total charge provided to the battery.

Although the present invention has been particularly described with respect to lithium-based batteries, due to their particular needs, it should be noted that the present invention is also useful with other types of batteries as well. Further, although the present invention has been described with particularity with respect to the processes therein, variations of the above may suggest themselves to those of skill in the art. Therefore, the scope of the present invention is to be limited only by the claims below.

We claim:

1. A method for charging a battery, comprising the steps of:
   applying a plurality of charge pulses to said battery, said charge pulses each having a duration and being separated by a corresponding plurality of rest periods;
   applying an extended charge pulse to said battery, said extended charge pulse having a duration greater than said durations of said charge pulses;
   measuring the charge pulse voltage (CPV) of said battery during said extended charge pulse;
   applying a subsequent rest period to said battery after said extended charge pulse;
   measuring the open circuit voltage (OCV) of said battery during said subsequent rest period;
   determining the difference between said CPV and said OCV; and
   terminating charging of said battery if said difference is less than a predetermined value.

2. A method for charging a battery, comprising the steps of:
   applying a plurality of charge pulses to said battery, said charge pulses each having a duration and being separated by a corresponding plurality of rest periods;
   applying a plurality of alternating charge pulses and discharge pulses to said battery;
   measuring the charge pulse voltage (CPV) of said battery during at least one of said alternating charge pulses;
   applying a subsequent rest period to said battery after said plurality of alternating charge pulses and discharge pulses;
   measuring the open circuit voltage (OCV) of said battery during said subsequent rest period;
   determining the difference between said CPV and said OCV; and
   terminating charging of said battery if said difference is less than a predetermined value.

3. The method of claim 2 and, after said step of applying said plurality of charge pulses, further comprising the steps of:
   applying an extended charge pulse to said battery, said extended charge pulse having a duration greater than said durations of said charge pulses, and
   applying a rest period to said battery after said extended charge pulse.

4. A method for charging a battery, comprising the steps of:
   applying a plurality of charge pulses to said battery, said charge pulses being separated by a corresponding plurality of rest periods;
   applying a subsequent discharge pulse to said battery;
   measuring the loaded circuit voltage (LCV) of said battery during said subsequent discharge pulse;
   applying a subsequent rest period to said battery after said subsequent discharge pulse;
   measuring the open circuit voltage (OCV) of said battery during said subsequent rest period;
   determining the difference between said LCV and said OCV; and
   terminating charging of said battery if said difference is less than a predetermined value.

5. The method of claim 4 and, after said step of applying said plurality of charge pulses, said charge pulses each having a duration, and further comprising the steps of:
   applying an extended charge pulse to said battery, said extended charge pulse having a duration greater than said durations of said charge pulses; and
   applying a rest period to said battery after said extended charge pulse.

6. The method of claim 4 and, after said step of applying said plurality of charge pulses, further comprising the steps of:
   applying a plurality of alternating charge pulses and discharge pulses to said battery, each said discharge pulse having an amplitude; and
   applying a rest period to said battery after said plurality of alternating charge pulses and discharge pulses;
   wherein said discharge pulse has an amplitude greater than said amplitudes of said discharge pulses of said plurality of alternating charge pulses and discharge pulses.

7. The method of claim 4 and, after said step of applying said plurality of charge pulses, said charge pulses each having a duration, further comprising the steps of:
   applying an extended charge pulse to said battery, said extended charge pulse having a duration greater than said durations of said charge pulses;
   applying a rest period to said battery after said extended charge pulse;
   applying a plurality of alternating charge pulses and discharge pulses to said battery, each said discharge pulse having an amplitude; and
   applying a rest period to said battery after said plurality of alternating charge pulses and discharge pulses;
   wherein said discharge pulse has an amplitude greater than said amplitudes of said discharge pulses of said plurality of alternating charge pulses and discharge pulses.

8. The method of claim 4 and further comprising the steps of:
   if said difference is greater than said predetermined value, but less than a second predetermined value, then increasing at least one of amplitude or the duration of said subsequent discharge pulse, and
   repeating the steps previous to these steps.

9. A method of charging a battery, comprising the steps of:
   applying a plurality of charge pulses to said battery, said charge pulses each having a duration and being separated by a corresponding plurality of rest periods;

applying a rest period to said battery after said plurality of charge pulses;
applying a subsequent discharge pulse to said battery, said subsequent discharge pulse having an amplitude greater than said amplitudes of said plurality of charge pulses;
measuring the loaded circuit voltage (LCV) of said battery during said subsequent discharge pulse;
applying a subsequent rest period to said battery after said subsequent discharge pulse;
measuring the open circuit voltage (OCV) of said battery during said subsequent rest period;
determining the difference between said LCV and said OCV; and
terminating charging of said battery if said difference is less than a predetermined value.

10. The method of claim 9 and, after said step of applying said rest period to said battery after said plurality of charge pulses, further comprising the steps of:
applying an extended charge pulse to said battery, said extended charge pulse having a duration greater than said durations of said charge pulses, said extended charge pulse having an amplitude; and
applying a rest period to said battery after said extended charge pulse; and
wherein said amplitude of said subsequent discharge pulse is greater than said amplitude of said extended charge pulse.

11. The method of claim 9 and, after said step of applying said rest period to said battery after said plurality of charge pulses, further comprising the steps of:
applying a plurality of alternating charge pulses and discharge pulses to said battery, each said discharge pulse having an amplitude;
applying a rest period to said battery after said plurality of alternating charge pulses and discharge pulses; and
wherein said subsequent discharge pulse has an amplitude greater than said amplitudes of said discharge pulses of said plurality of alternating charge pulses and discharge pulses.

12. The method of claim 9 and, after said step of applying said rest period to said battery after said plurality of charge pulses, further comprising the steps of:
applying an extended charge pulse to said battery, said extended charge pulse having a duration greater than said durations of said charge pulses, said extended charge pulse having an amplitude; and
applying a rest period to said battery after said extended charge pulse;
applying a plurality of alternating charge pulses and discharge pulses to said battery, each said discharge pulse having an amplitude;
applying a rest period to said battery after said plurality of alternating charge pulses and discharge pulses; and
wherein said amplitude of said subsequent discharge pulse is greater than said amplitude of said extended charge pulse and greater than said amplitudes of said discharge pulses of said plurality of alternating charge pulses and discharge pulses.

13. The method of claim 9 and further comprising the steps of:
if said difference is greater than said predetermined value, but less than a second predetermined value, then increasing at least one of amplitude or the duration of said subsequent discharge pulse, and
repeating the steps previous to these steps.

14. A method of charging a battery, comprising the steps of:
applying a discharge pulse to said battery;
applying a rest period to said battery after said discharge pulse;
applying an extended charge pulse to said battery;
applying a rest period to said battery after said extended charge pulse;
applying a plurality of alternating charge pulses and discharge pulses to said battery;
measuring the loaded circuit voltage (LCV) of said battery during a discharge pulse of said plurality of alternating charge pulses and discharge pulses;
applying a rest period to said battery after said plurality of alternating charge pulses and discharge pulses;
measuring the open circuit voltage (OCV) of said battery during said rest period after said plurality of alternating charge pulses and discharge pulses;
determining the difference between said LCV and said OCV; and
terminating charging of said battery if said difference is less than a predetermined value.

15. The method of claim 14 and, prior to said step of applying said discharge pulse to said battery, further comprising the step of:
applying a plurality of charge pulses to said battery, said charge pulses each having an amplitude and being separated by a corresponding plurality of rest periods, said discharge pulse having an amplitude greater than said amplitudes of said plurality of charge pulses.

16. The method of claim 14 and, prior to said step of applying said discharge pulse to said battery, further comprising the steps of:
applying a plurality of charge pulses to said battery, said charge pulses each having an amplitude and being separated by a corresponding plurality of rest periods, said discharge pulse having an amplitude greater than said amplitudes of said plurality of charge pulses; and
applying a rest period to said battery after said plurality of charge pulses.

17. The method of claim 14 and further comprising the steps of:
if said difference is greater than said predetermined value, but less than a second predetermined value, then increasing at least one of amplitude or the duration of said subsequent discharge pulse, and
repeating the steps previous to these steps.

18. The method of any one of claims 1, 2, 4, 9, 15 or 16, and further comprising the step of:
increasing a predetermined parameter of said charge pulses of said plurality of charge pulses from the beginning of said plurality to the end of said plurality so that said parameter of the last charge pulse of said plurality of charge pulses is greater than said parameter of the charge pulse of said plurality of charge pulses, and wherein said predetermined parameter is a selected one of the amplitude of a said charge pulse or the duration of a said charge pulse.

19. The method of any one of claims 1, 2, 4, 9, 15 or 16, and further comprising the steps of:
if said difference is greater than said predetermined value then increasing the number of said charge pulses of said plurality of charge pulses, and
repeating the steps previous to these steps.

20. The method of any one of claims 1, 2, 4, 9, 15 or 16 and further comprising the steps of:
   if said difference is greater than said predetermined value, but less than a second predetermined value, then increasing the durations of said rest periods between said plurality of charge pulses.

21. An apparatus for charging a battery, comprising:
   a charging circuit for applying charge pulses to said battery; and
   a controller for: causing said charging circuit to apply a plurality of charge pulses to said battery, said charge pulses each having a duration and being separated by a corresponding plurality of rest periods; causing said charging circuit to apply an extended charge pulse to said battery, said extended charge pulse having a duration greater than said durations of said charge pulses; measuring the charge pulse voltage (CPV) of said battery during said extended charge pulse; applying a subsequent rest period to said battery after said extended charge pulse; measuring the open circuit voltage (OCV) of said battery during said subsequent rest period; determining the difference between said CPV and said OCV; and terminating charging of said battery if said difference is less than a predetermined value.

22. An apparatus for charging a battery, comprising:
   a charging circuit for applying charge pulses to said battery;
   a discharging circuit for applying discharge pulses to said battery; and
   a controller for: causing said charging circuit to apply a plurality of charge pulses to said battery, said charge pulses each having a duration and being separated by a corresponding plurality of rest periods; causing said charging circuit and said discharging circuit to apply a plurality of alternating charge pulses and discharge pulses to said battery; measuring the charge pulse voltage (CPV) of said battery during at least one of said alternating charge pulses; applying a subsequent rest period to said battery after said plurality of alternating charge pulses and discharge pulses; measuring the open circuit voltage (OCV) of said battery during said subsequent rest period; determining the difference between said CPV and said OCV; and terminating charging of said battery if said difference is less than a predetermined value.

23. An apparatus for charging a battery, comprising:
   a charging circuit for applying charge pulses to said battery;
   a discharging circuit for applying discharge pulses to said battery; and
   a controller for: causing said charging circuit to apply a plurality of charge pulses to said battery, said charge pulses being separated by a corresponding plurality of rest periods; causing said discharging circuit to apply a subsequent discharge pulse to said battery; measuring the loaded circuit voltage (LCV) of said battery during said subsequent discharge pulse; applying a subsequent rest period to said battery after said subsequent discharge pulse; measuring the open circuit voltage (OCV) of said battery during said subsequent rest period; determining the difference between said LCV and said OCV; and terminating charging of said battery if said difference is less than a predetermined value.

24. An apparatus for charging a battery, comprising:
   a charging circuit for applying charge pulses to said battery;
   a discharging circuit for applying discharge pulses to said battery; and
   a controller for: causing said charging circuit to apply a plurality of charge pulses to said battery, said charge pulses each having a duration and being separated by a corresponding plurality of rest periods; applying a rest period to said battery after said plurality of charge pulses; causing said discharging circuit to apply a subsequent discharge pulse to said battery, said subsequent discharge pulse having an amplitude greater than said amplitudes of said plurality of charge pulses; measuring the loaded circuit voltage (LCV) of said battery during said subsequent discharge pulse; applying a subsequent rest period to said battery after said subsequent discharge pulse; measuring the open circuit voltage (OCV) of said battery during said subsequent rest period; determining the difference between said LCV and said OCV; and terminating charging of said battery if said difference is less than a predetermined value.

25. An apparatus for charging a battery, comprising:
   a discharging circuit for applying discharge pulses to said battery;
   a charging circuit for applying charge pulses to said battery; and
   a controller for: causing said discharging circuit to apply a discharge pulse to said battery; applying a rest period to said battery after said discharge pulse; for causing said charging circuit to apply an extended charge pulse to said battery; applying a rest period to said battery after said extended charge pulse; causing said charging circuit and said discharging circuit to apply a plurality of alternating charge pulses and discharge pulses to said battery; measuring the loaded circuit voltage (LCV) of said battery during a discharge pulse of said plurality of alternating charge pulses and discharge pulses; applying a rest period to said battery after said plurality of alternating charge pulses and discharge pulses; measuring the open circuit voltage (OCV) of said battery during said rest period after said plurality of alternating charge pulses and discharge pulses; determining the difference between said LCV and said OCV; and terminating charging of said battery if said difference is less than a predetermined value.

* * * * *